(12) United States Patent
Coutin

(10) Patent No.: US 11,629,870 B2
(45) Date of Patent: Apr. 18, 2023

(54) ECS USING CABIN OUTFLOW AIR AS AN ELECTRICITY SOURCE

(71) Applicant: Hamilton Sundstrand Corporation, Charlotte, NC (US)

(72) Inventor: Aiden Coutin, Enfield, CT (US)

(73) Assignee: HAMILTON SUNDSTRAND CORPORATION, Charlotte, NC (US)

(*) Notice: Subject to any disclaimer, the term of this patent is extended or adjusted under 35 U.S.C. 154(b) by 165 days.

(21) Appl. No.: 17/154,672

(22) Filed: Jan. 21, 2021

(65) Prior Publication Data

US 2021/0362858 A1 Nov. 25, 2021

Related U.S. Application Data

(60) Provisional application No. 62/990,742, filed on Mar. 17, 2020.

(51) Int. Cl.
| F24F 7/00 | (2021.01) |
| F24F 7/003 | (2021.01) |
| B64D 13/06 | (2006.01) |
| F03D 1/02 | (2006.01) |

(52) U.S. Cl.
CPC .............. *F24F 7/003* (2021.01); *B64D 13/06* (2013.01); *F03D 1/02* (2013.01); *B64D 2013/0618* (2013.01); *B64D 2013/0648* (2013.01)

(58) Field of Classification Search
CPC .......... F24F 7/003; F03D 1/002; B64D 13/06; B64D 2013/0618; B64D 2013/0648; B64D 2013/0644; Y02T 50/50; Y02E 10/72

See application file for complete search history.

(56) References Cited

U.S. PATENT DOCUMENTS

| 5,967,461 | A | 10/1999 | Farrington |
| 6,526,775 | B1 | 3/2003 | Asfia et al. |
| 6,928,832 | B2 | 8/2005 | Lents et al. |
| 9,669,936 | B1* | 6/2017 | Fiterman ................ B64D 13/06 |
| 10,288,325 | B2* | 5/2019 | Vaisman ................ F25B 9/06 |
| 10,526,092 | B2* | 1/2020 | DeFrancesco ...... F04D 29/5826 |
| 10,533,784 | B2* | 1/2020 | Army .................... B64D 13/06 |
| 10,731,501 | B2* | 8/2020 | Bruno ...................... F02C 9/18 |
| 10,773,807 | B2* | 9/2020 | Hall ..................... F04D 29/053 |
| 2016/0032841 | A1 | 2/2016 | Ronan |
| 2016/0231031 | A1 | 8/2016 | Bruno |
| 2018/0370636 | A1 | 12/2018 | Laborde et al. |
| 2019/0217960 | A1* | 7/2019 | Behrens ................ B64D 13/06 |
| 2019/0359339 | A1 | 11/2019 | Pachidis et al. |

OTHER PUBLICATIONS

European Extended Search Report; European Application No. 21163229.4; dated Aug. 10, 2021; 12 pages.

* cited by examiner

*Primary Examiner* — Carl C Staubach
*Assistant Examiner* — Sherman D Manley
(74) *Attorney, Agent, or Firm* — Cantor Colburn LLP

(57) ABSTRACT

An environmental control system of a vehicle including a first inlet for providing a first medium, a second inlet for providing a second medium, a compression device arranged in fluid communication with the first inlet, and an expansion device separate from the compression device. The expansion device is arranged in fluid communication with the second inlet. Energy extracted from the second medium within the expansion device is provided to one or more loads of the vehicle.

18 Claims, 1 Drawing Sheet

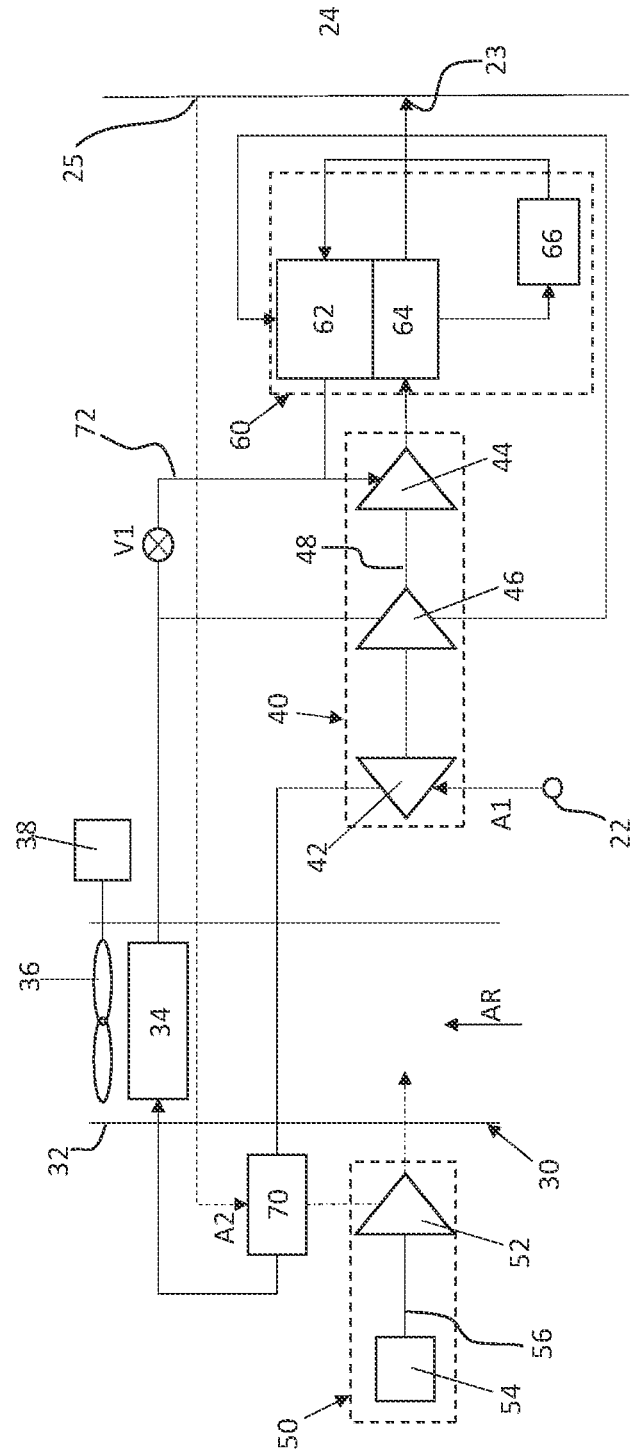

ECS USING CABIN OUTFLOW AIR AS AN ELECTRICITY SOURCE

CROSS-REFERENCE TO RELATED APPLICATIONS

This application claims the benefit of U.S. Provisional Application 62/990,742 filed Mar. 17, 2020, the disclosure of which is incorporated herein by reference in its entirety.

BACKGROUND

Embodiments of the disclosure relate to environmental control systems, and more specifically to an environmental control system of an aircraft.

Aircraft need to have their internal environment controlled. In general, contemporary air conditioning systems are supplied a pressure at cruise that is approximately 30 psig to 35 psig. The trend in the aerospace industry today is towards smaller systems with higher efficiency. One approach to improve efficiency of an aircraft environmental control system is to eliminate the bleed air entirely and use electrical power to compress outside air. A second approach is to use lower engine pressure. The third approach is to use the energy in the cabin outflow air to compress outside air and bring it into the cabin. Each of these approaches alone provides limited efficiency with respect to engine fuel burn.

BRIEF DESCRIPTION

According to one or more embodiments, an environmental control system of a vehicle including a first inlet for providing a first medium, a second inlet for providing a second medium, a compression device arranged in fluid communication with the first inlet, and an expansion device separate from the compression device. The expansion device is arranged in fluid communication with the second inlet. Energy extracted from the second medium within the expansion device is provided to one or more loads of the vehicle.

In addition to one or more of the features described above, or as an alternative, in further embodiments the expansion device includes a turbo-generator.

In addition to one or more of the features described above, or as an alternative, in further embodiments comprising a heat exchanger arranged upstream from the expansion device relative to a flow of the second medium, wherein heat is transferred from the first medium to the second medium in the heat exchanger.

In addition to one or more of the features described above, or as an alternative, in further embodiments, the second medium output from the expansion device is exhausted overboard.

In addition to one or more of the features described above, or as an alternative, in further embodiments comprising a ram air circuit including a ram air shell having a ram air heat exchanger positioned therein.

In addition to one or more of the features described above, or as an alternative, in further embodiments the second medium output from the expansion device is provided to the ram air shell.

In addition to one or more of the features described above, or as an alternative, in further embodiments the environmental control system includes an outlet, and the first medium provided to the outlet has at least one of a temperature and pressure different from the first medium provided to the first inlet.

In addition to one or more of the features described above, or as an alternative, in further embodiments the first medium is bleed air.

In addition to one or more of the features described above, or as an alternative, in further embodiments the second medium is cabin outflow air.

In addition to one or more of the features described above, or as an alternative, in further embodiments the energy extracted from the second medium within the expansion device is provided to a battery.

In addition to one or more of the features described above, or as an alternative, in further embodiments the one or more loads that receive the energy extracted from the second medium within the expansion device are external to the environmental control system.

In addition to one or more of the features described above, or as an alternative, in further embodiments the compression device includes a compressor, turbine, and power turbine, operably coupled via a shaft.

In addition to one or more of the features described above, or as an alternative, in further embodiments both the turbine and the power turbine are configured to receive a flow of the first medium.

In addition to one or more of the features described above, or as an alternative, in further embodiments the environmental control system is operable in a plurality of modes including a first mode and a second mode, wherein in the first mode, energy extracted from both the turbine and the power turbine is used to operate the compressor, and in the second mode, energy extracted from only the turbine is used to operate the compressor.

According to another embodiment, a method of operating an environmental control system of a vehicle includes supplying a first medium to aa first inlet, adjusting at least one of a temperature and pressure of the first medium within the environmental control system to produce a conditioned first medium, supplying a second medium to a second inlet, and generating electricity by extracting energy from the second medium via an expansion device.

In addition to one or more of the features described above, or as an alternative, in further embodiments comprising supplying the generated electricity to one or more loads of the vehicle.

In addition to one or more of the features described above, or as an alternative, in further embodiments comprising heating the second medium directly upstream from the expansion device.

In addition to one or more of the features described above, or as an alternative, in further embodiments comprising exhausting the second medium from the expansion device overboard.

In addition to one or more of the features described above, or as an alternative, in further embodiments comprising exhausting the second medium from the expansion device into a ram air circuit.

In addition to one or more of the features described above, or as an alternative, in further embodiments the first medium is bleed air and the second medium is cabin outflow air.

Additional features and advantages are realized through the techniques of the embodiments herein. Other embodiments are described in detail herein and are considered a part of the claims. For a better understanding of the embodiments with the advantages and the features, refer to the description and to the drawings.

BRIEF DESCRIPTION OF THE DRAWING

The following description should not be considered limiting in any way. With reference to the accompanying drawing, like elements are numbered alike:

The FIGURE is a simplified schematic diagram of a system according to an embodiment.

DETAILED DESCRIPTION

A detailed description of one or more embodiments of the disclosed apparatus and method are presented herein by way of exemplification and not limitation with reference to the FIGURE.

Embodiments herein provide an environmental control system of an aircraft that mixes mediums from different sources and uses energy from one or more of the different sources to power the environmental control system and to provide cabin pressurization and cooling at a high fuel burn efficiency. The mediums described herein are generally types of air; however, it should be understood that other mediums, such as gases, liquids, fluidized solids, or slurries are also contemplated herein.

With reference now to the FIGURE, a schematic diagram of a portion of an environment control system (ECS) 20, such as a pack for example, is depicted according to non-limiting embodiments. Although the environmental control system 20 is described with reference to an aircraft, alternative applications are also within the scope of the disclosure. As shown in the FIGURE, the system 20 can receive a first medium A1 at an inlet 22 and provide a conditioned form of the first medium to one or more loads, such as a volume 24 for example, via an outlet 23. In embodiments where the environmental control system 20 is used in an aircraft application, the first medium A1 is bleed air, which can be pressurized air originating from (e.g., being "bled" from) an engine or auxiliary power unit of the aircraft. It shall be understood that one or more of the temperature, humidity, flow rate, and pressure of the bleed air can vary based upon the compressor stage from which the air is drawn and revolutions per minute of the engine, or the auxiliary power unit from which the air is drawn.

The system 20 is also configured to receive a second medium A2 via a second inlet 25, such as from the volume 24. In one embodiment, the volume 24 is the cabin of an aircraft and the second medium A2 is cabin discharge or outflow air, which is air leaving the volume 24 that would typically be discharged overboard. In some embodiments, the system 20 is configured to extract work from the second medium A2. In this manner, the pressurized air A2 of the volume 24 can be utilized by the system 20 to achieve certain operations.

The environmental control system 20 includes a ram air circuit 30 including a shell or duct, illustrated schematically at 32, within which one or more heat exchangers are located. The shell 32 can receive and direct a medium, such as ram air AR for example, through a portion of the system 20. The one or more heat exchangers 34 arranged within the shell 32 may be referred to as ram heat exchangers and are built for efficient heat transfer from one medium to another. Within the one or more heat exchangers 34, ram air AR, such as outside air for example, acts as a heat sink to cool a medium passing there through, for example the first medium A1. Examples of the type of heat exchangers that may be used, include, but are not limited to, double pipe, shell and tube, plate, plate and shell, adiabatic shell, plate fin, pillow plate, and fluid heat exchangers. As shown, a fan 36 is disposed within the ram air shell 32. The fan 36 is operable to force via push or pull methods a medium (e.g., ram air) through the shell 32 across the one or more ram heat exchangers 34.

The system 20 additionally comprises at least one compression device. In the illustrated, non-limiting embodiment, the compression device 40 is a mechanical device that includes components for performing thermodynamic work on a medium (e.g., extracts work from or applies work to the first medium A1, the second medium A2, by raising and/or lowering pressure and by raising and/or lowering temperature). Examples of the compression device 40 include an air cycle machine, a three-wheel air cycle machine, a four-wheel air cycle machine, etc.

As shown, the compression device 40 includes a compressor 42, a turbine 44, and a power turbine 46 operably coupled to each other via a shaft 48. The compressor 42 is a mechanical device that raises a pressure of a medium and can be driven by another mechanical device (e.g., a motor or a medium via a turbine). Examples of compressor types include centrifugal, diagonal or mixed-flow, axial-flow, reciprocating, ionic liquid piston, rotary screw, rotary vane, scroll, diaphragm, air bubble, etc. As shown, the compressor 42 is configured to receive and pressurize the first medium A1. The turbine 44 and the power turbine 46 are mechanical devices that expand a medium and extract work therefrom (also referred to as extracting energy). In the compression device 40, the turbines 44, 46 are configured to drive the compressor 42 via the shaft 48.

The system 20 additionally comprises at least one expansion device 50. The expansion device 50 is a mechanical device, similar to the compression device 40, and includes one or more components for performing thermodynamic work on a medium (e.g., extracts work from or applies work to the first medium A1 by raising and/or lowering pressure and by raising and/or lowering temperature). Examples of the expansion device 50 include, but are not limited to, a simple air cycle machine or a tip turbine fan etc.

In the illustrated, non-limiting embodiment, the expansion device 50 is a turbo-generator including a turbine 52 and an electrical generator 54 operably coupled via a shaft 56. However, it should be understood that any suitable expansion device, including an air cycle machine having any number of wheels (i.e. three-wheel or four-wheel) are also within the scope of the disclosure. The turbine 52 is a mechanical device that expands a medium and extracts work therefrom. In the expansion device 50, the turbine 52 drives an impeller (not shown) of the generator 54 via the shaft 56. In a non-limiting embodiment, the turbine 52 can comprise a nozzle configured to accelerate a medium supplied thereto for entry into a turbine impeller (not shown).

The system 20 additionally includes at least one dehumidification system 60. In the illustrated, non-limiting embodiment, the dehumidification system 60 includes a reheater 62, a condenser 64, and a water extractor 66. The reheater 62 and the condenser 64 are particular types of heat exchangers. The water extractor 66 is a mechanical device that performs a process of removing water from the medium. Together, the condenser 64, the water extractor 66, and/or the reheater 62 can be combined to form a medium pressure water separator.

The elements of the system 20 are connected via valves, tubes, pipes, and the like. Valves (e.g., flow regulation device or mass flow valve) are devices that regulate, direct, and/or control a flow of a medium by opening, closing, or partially obstructing various passageways within the tubes, pipes, etc. of the system. Valves can be operated by actuators, such that flow rates of the medium in any portion of the system 20 can be regulated to a desired value.

The system 20 is operable in a plurality of modes, selectable based on a flight condition of the aircraft. In an embodiment, the system 20 is operable in a first mode when the aircraft is on the ground and in a second mode when the aircraft is in flight, such as high altitude cruise, climb, and/or descent for example.

During operation in the first mode, the first medium A1 enters the ECS 20 at the inlet 22. In the illustrated, non-limiting embodiment, the first medium A1 is provided from the inlet 22 directly to the compressor 42. However, embodiments where one or more components, such as a heat exchanger for example, are arranged upstream from the compressor 42 are also within the scope of the disclosure. Within the compressor 42, the first medium A1 is compressed causing the temperature and the pressure of the first medium A1 to increase. The heated, pressurized first medium A1 output from the compressor 42 is then provided to an outflow heat exchanger 70. In an embodiment, the outflow heat exchanger 70 utilizes the second medium A2, such as cabin discharge air sourced from the volume 24 for example, to cool the first medium A1.

From the outflow heat exchanger 70, the heated second medium A2 is expanded across the turbine 52 of the expansion device and work is extracted therefrom. The work extracted by the turbine 52 of the expansion device 50 drives the generator 54, thereby creating electricity. In an embodiment, the electricity created within the generator may be distributed to one or more electrical loads of the aircraft, such as remote from the environmental control system 20, or alternatively, may be stored within a battery (not shown). The cooled, reduced pressure second medium A2 output from the turbine 52 of the expansion device 50 may be exhausted overboard, or alternatively, may be dumped into the ram air circuit 30, upstream or downstream of the at least one heat exchanger 34. In embodiments where the second medium A2 is provided to the ram air circuit 30, this additional air may be used to supplement the cooling performed by the ram air circuit 30.

The first medium A1 output from the outflow heat exchanger 70 is provided to at least one ram heat exchanger 34. As shown, the fan 36 is used to move air, such as ram air for example, through or across the ram air heat exchanger 34 to further cool the temperature of the first medium A1 within the ran air heat exchanger 34. In the illustrated, non-limiting embodiment, the fan 36 is a tip turbine fan driven by a motor 38. However, in other embodiments, the fan 36 may be part of the compression device or alternatively, the expansion device 50.

The first medium A1 output from the ram air heat exchanger 34 is provided to the power turbine 46 of the compression device 40. The first medium A1 is expanded across the power turbine 46 and work is extracted therefrom. The work extracted by the turbine 46 is used to drive the compressor 42 via shaft 48.

The cooled, reduced pressure first medium A1 output from the power turbine 46 is typically provided to the dehumidification system 60. The first medium A1 is configured to flow through the reheater 62, the condenser 64, and the water extractor 66 sequentially. The first medium A1 is cooled and further cooled within the reheater 62 and the condenser 64, respectively, causing any moisture within the first medium A1 to condense. This moisture is then removed within the water extractor 66 and the first medium A1 is provided again to the reheater 62. Within this second pass through the reheater 62, the first medium A1 is at least partially heated to produce a warm, dry first medium A1.

From the second pass of the reheater 62, the warm, dry first medium A1 may be provided to an inlet of the turbine 44. The warm, dry first medium A1 is expanded across the turbine 44 and work is extracted therefrom. The work extracted by the turbine 44 is combined with the work extracted from the power turbine 46 to drive the compressor 42 via the shaft 48. The cooled, reduced pressure first medium A1 output from the turbine 44 is then provided to the condenser 64, where the first medium is heated prior to being delivered to one or more loads of the aircraft, such as the volume 24 for example.

Operation of the ECS 20 in a second mode of operation, such as when the aircraft is in flight, is similar to operation in the first mode. However, during operation in the second mode, the flow of the first medium A1 is configured to bypass the power turbine 46. As a result, the compressor 42 is driven solely by the energy extracted via turbine 44. As previously described, the first medium A1 is pressurized and heated within the compressor 42, is partially cooled within the outflow heat exchanger 70, and is further cooled within the ram air heat exchanger 34. The fan 36 may only be used to move ram air through the ram air circuit 30 in instances where the ram recovery, for example the pressure of the ram air provided to the ram air circuit 30, is insufficient to drive the ram air flow across the heat exchanger 34. In an embodiment, the fan 36 is only driven when the aircraft is on the ground, at low altitude, or in a low speed operation. However, during cruise at high altitude for example, the fan 36 need not be used to facilitate movement of the ram air.

After making one or more passes through the ram air heat exchanger 34, the first medium A1 is configured to flow through a bypass conduit 72, directly to an inlet of the turbine 44. In the second mode of operation, the valve V1 is at least partially open, thereby allowing some or all of the first medium A1 to flow into the bypass conduit 72. The cooled, reduced pressure first medium A1 output from the turbine 44 is then provided to the condenser 64, where the first medium A1 before being delivered to one or more loads of the aircraft, such as the volume 24 for example. In embodiments where the valve V1 is only partially open, a portion of the first medium A1 will follow the flow path described with respect to the first mode.

In both the first and second modes of operation, the second medium A2 is heated, such as via a heat exchange relationship with the first medium A1, to increase and/or maximize the energy extracted from the second medium A2, and therefore the electrical energy that can be collected or generated using the second medium A2.

Aspects of the embodiments are described herein with reference to flowchart illustrations, schematics, and/or block diagrams of methods, apparatus, and/or systems according to embodiments. Further, the descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

While the preferred embodiment has been described, it will be understood that those skilled in the art, both now and in the future, may make various improvements and enhancements which fall within the scope of the claims which follow. These claims should be construed to maintain the proper protection.

What is claimed is:

1. An environmental control system of a vehicle comprising:
   a first inlet for providing a first medium;
   a second inlet for providing a second medium;
   a compression device arranged in fluid communication with the first inlet, the compression device including a compressor, turbine, and power turbine, operably coupled via a shaft;
   an expansion device separate from the compression device, the expansion device being arranged in fluid communication with the second inlet, wherein energy extracted from the second medium within the expansion device is provided to one or more loads of the vehicle;
   wherein the environmental control system is operable in a plurality of modes including a first mode and a second mode, wherein in the first mode, energy extracted from both the turbine and the power turbine is used to operate the compressor, and in the second mode, energy extracted from only the turbine is used to operate the compressor.

2. The environmental control system of claim 1, wherein the expansion device includes a turbo-generator.

3. The environmental control system of claim 1, further comprising a heat exchanger arranged upstream from the expansion device relative to a flow of the second medium, wherein heat is transferred from the first medium to the second medium in the heat exchanger.

4. The environmental control system of claim 1, wherein the second medium output from the expansion device is exhausted overboard.

5. The environmental control system of claim 1, further comprising a ram air circuit including a ram air shell having a ram air heat exchanger positioned therein.

6. The environmental control system of claim 5, wherein the second medium output from the expansion device is provided to the ram air shell.

7. The environmental control system of claim 1, wherein the environmental control system includes an outlet, and the first medium provided to the outlet has at least one of a temperature and pressure different from the first medium provided to the first inlet.

8. The environmental control system of claim 1, wherein the first medium is bleed air.

9. The environmental control system of claim 1, wherein the second medium is cabin outflow air.

10. The environmental control system of claim 1, wherein the energy extracted from the second medium within the expansion device is provided to a battery.

11. The environmental control system of claim 1, wherein the one or more loads that receive the energy extracted from the second medium within the expansion device are external to the environmental control system.

12. The environmental control system of claim 1, wherein both the turbine and the power turbine are configured to receive a flow of the first medium.

13. A method of operating an environmental control system of a vehicle comprising:
   supplying a first medium to aa first inlet;
   adjusting at least one of a temperature and pressure of the first medium within the environmental control system to produce a conditioned first medium, wherein adjusting at least one of the temperature and pressure occurs via a compression device including a compressor, turbine, and power turbine, operably coupled via a shaft;
   supplying a second medium to a second inlet; and
   generating electricity by extracting energy from the second medium via an expansion device;
   wherein the environmental control system is operable in a plurality of modes including a first mode and a second mode, wherein in the first mode, energy extracted from both the turbine and the power turbine is used to operate the compressor, and in the second mode, energy extracted from only the turbine is used to operate the compressor.

14. The method of claim 13, further comprising supplying the generated electricity to one or more loads of the vehicle.

15. The method of claim 13, further comprising heating the second medium directly upstream from the expansion device.

16. The method of claim 13, further comprising exhausting the second medium from the expansion device overboard.

17. The method of claim 13, further comprising exhausting the second medium from the expansion device into a ram air circuit.

18. The method of claim 13, wherein the first medium is bleed air and the second medium is cabin outflow air.

* * * * *